United States Patent [19]

Breed

[11] Patent Number: 4,848,792
[45] Date of Patent: Jul. 18, 1989

[54] EVENT SEQUENCE INDICATOR

[75] Inventor: David S. Breed, Boonton Township, Morris County, N.J.

[73] Assignee: Breed Automotive Technology, Inc., Boonton Township, Morris County, N.J.

[21] Appl. No.: 277,473

[22] Filed: Nov. 23, 1988

Related U.S. Application Data

[63] Continuation of Ser. No. 166,766, Mar. 3, 1988, abandoned, which is a continuation of Ser. No. 935,394, Nov. 26, 1986, abandoned.

[51] Int. Cl.$^4$ ............................................. G01P 15/04
[52] U.S. Cl. ..................................... 280/734; 73/492; 346/7
[58] Field of Search ............... 280/734, 727, 728, 729, 280/730, 731, 732, 733, 734; 222/3; 73/35, 489, 491, 492; 340/52 H; 346/7

[56] References Cited

U.S. PATENT DOCUMENTS

| | | | |
|---|---|---|---|
| 3,707,722 | 12/1972 | Itoh | 73/492 |
| 3,877,720 | 4/1975 | Upmeier | 280/734 |
| 3,915,474 | 10/1975 | Held et al. | 280/734 |
| 3,921,463 | 11/1975 | Robbins | 73/492 |

Primary Examiner—Richard A. Bertsch
Attorney, Agent, or Firm—Kane, Dalsimer, Sullivan, Kurucz, Levy, Eisele and Richard

[57] ABSTRACT

A miniature device for indicating if an airbag inflator for a vehicle was set off in an accident. The device records the movement of a ball in an enclosed tube. The record is made when the tube is collapsed around the ball in response to pressure or heat from the activated primer.

15 Claims, 4 Drawing Sheets

EVENT SEQUENCE INDICATOR

This is a continuation of co-pending application Ser. No. 935,394 filed on Nov. 26, 1986, now abandoned.

This is a continuation of co-pending application Ser. No. 166,766 filed on Mar. 3, 1988, now abandoned.

BACKGROUND OF THE INVENTION

1. Field of the Invention

The invention relates to airbags for vehicles. More particularly it relates to devices which determine if the airbag was set off in an accident.

2. Brief Description of the Prior Art

Airbags have proven effective in preventing drivers and passengers from being impaled on steering columns, smashed against dashboards and ejected through windshields during vehicular accidents. However in several cases of cars equipped with airbags where the airbags have been deployed, the driver of the vehicle has claimed that the airbag went off inadvertently and caused him to have the accident. There have been reports of inadvertent deployments of the airbags caused by radio interference.

Present airbag systems have no device for positively determining whether the airbag was set off by the sensor in response to an accident at the time the airbag was deployed or if it somehow went off by itself. This information is essential in determining the manufacturer's liability in the event the passenger asserts that an airbag caused the accident. The correct determination of liability is vital to the manufacturer's survival.

Some airbag systems have a diagnostic system which indicates whether an electrical current was sent to the inflator after an accident was sensed, but this does not positively indicate that the gas generator was started after an accident occurred.

A device has been disclosed in U.S. Pat. No. 3,915,474 by Held et. al. for solving this problem. This "recording mechanism for a safety device used in a motor vehicle" has not been adopted due primarily to its large size. A recording mechanism of this type to be usable must not contribute significantly to the size or weight of the airbag system. Any attempt to miniaturize this device, however, results in a problem that in some vigorous crashes the piston will rebound off the end of the cylinder and return to its initial position before the gases from the inflator have had time to arrest the motion of the sensing mass. Thus, in a miniaturized version, the device can give a false reading. The problem arises from the fact that it takes as much as 15 milliseconds from the time the sensor has indicated that the airbag should be deployed and the time that there is significant gas pressure in the inflator.

The present invention represents an improvement over the prior art described in U.S. Pat. No. 3,915,474 in that it uses the primer or squib gas to stop the motion of the sensing mass or pistons. This gas pressure is available in 1 to 2 milliseconds after sensor firing.

SUMMARY OF THE INVENTION

The principal object of the present invention is to provide a miniature device which indicates that an automobile was in an accident at the time the airbag was deployed.

Another object of the invention is to provide a miniature device which independently of the crash sensor indicates that an automobile was in an accident at the time the airbag was deployed. This will provide correct information in the event that the sensor itself was defective.

An additional object is to provide a means for positively ruling out the manufacturer's liability when an airbag is deployed during the course of an accident.

An additional object of this invention is to provide a method of determining whether a vehicle was in a crash when deployment of a safety device was initiated.

Yet another object is that the present invention is to be designed as small, lightweight, and relatively inexpensive to manufacture and assemble.

These and various other advantages and features of novelty which characterize the invention are pointed out with particularity in the claims annexed hereto and forming a part hereof. However for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals indicate corresponding parts throughout the several views.

DETAILED DESCRIPTION OF THE PREFERRED EMBODIMENT

Figure 1:
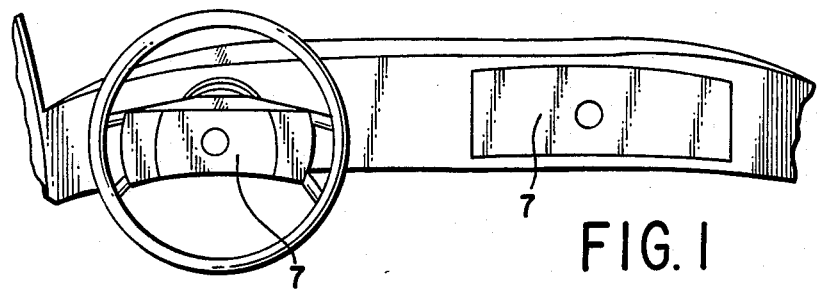
FIG. 1 is a view showing an airbag mounted on a vehicle steering wheel and in the dashboard.
Figure 2:
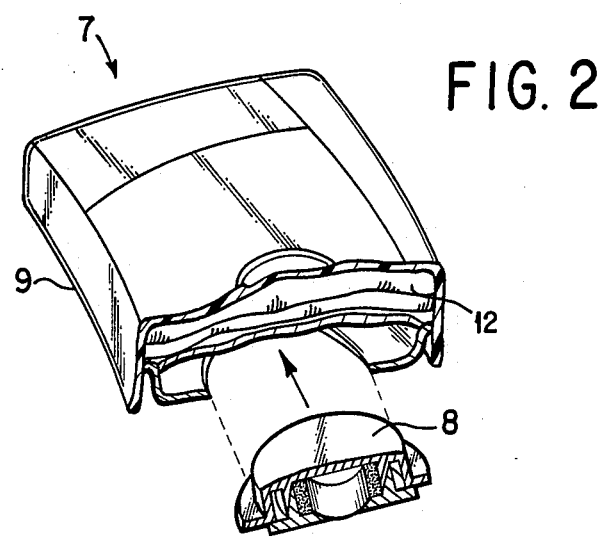
FIG. 2 is a cutaway of the airbag system with the gas generator broken away and removed.
Figure 3:
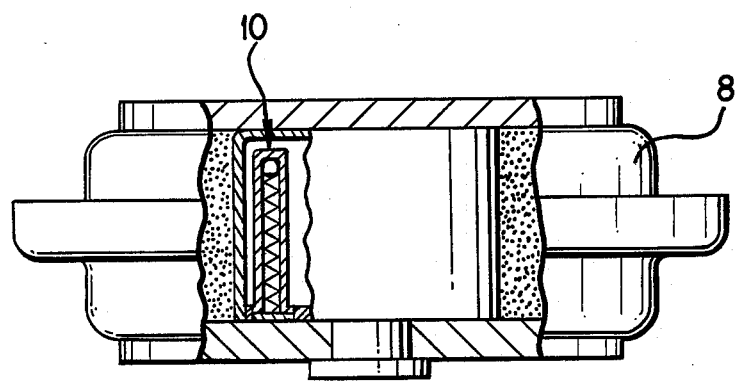
FIG. 3 is a cross section view of an inflator with the event sequence indicator inside the sensor which is, in turn, inside the inflator.
Figure 4:
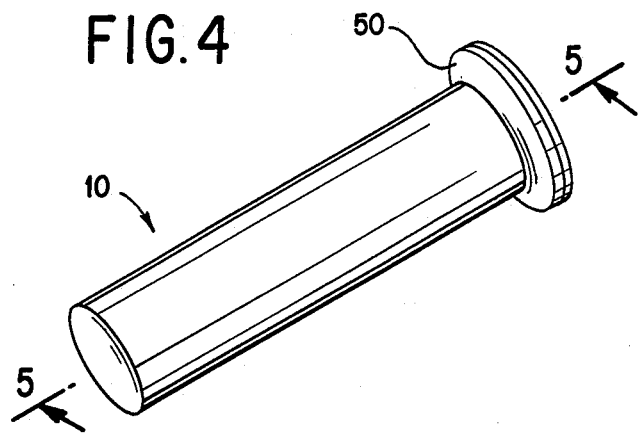
FIG. 4 is a view taken of the outside of a preferred embodiment of the event sequence indicator of the present invention.

In the drawings, an airbag safety restraint system 7 includes a gas generator 8 mounted interiorly inside the housing 9 for the folded airbag 12. Interior to the gas generator 8 is an event sequence indicator 10.

Figure 5:
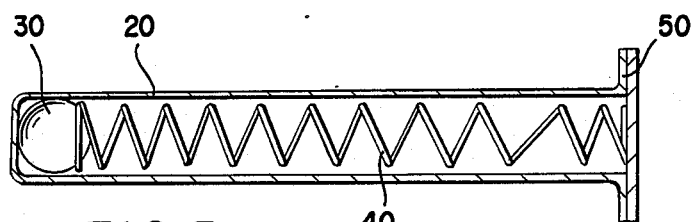
FIG. 5 is a view taken of a preferred embodiment of the present invention showing the rest condition.

Reference is now made to FIG. 5 which shows a cutaway view of the event sequence indicator 10 in the resting condition. The indicator is a tube 20 containing a ball 30 and a spring 40. The tube has a flange 50 to assist in positioning the tube inside the gas generator (inflator) of an airbag.

A preferred embodiment of the event sequence indicator consists of an aluminum tube 20 one inch long and approximately ⅛ inch internal diameter closed at both ends. Inside the tube is a ⅛ inch stainless steel ball 30 and a spring 40 which exerts a force on the ball greater than 1 G. The clearance between the ball and the tube is at least 0.003 inches, so that the tube can be made by conventional manufacturing techniques. The tube is placed inside the inflator near to the primer or squib, which could be also inside the sensor if the sensor is in the inflator, at such a location that when the primer chamber becomes pressurized the tube is subjected to the primer gas pressure. The tube is aligned in the inflator such that the axis of the tube lies substantially along the axis of the vehicle. If the inflator is in the steering column, for example, the axis of the tube would be parallel to the axis of the steering column.

Figure 6:
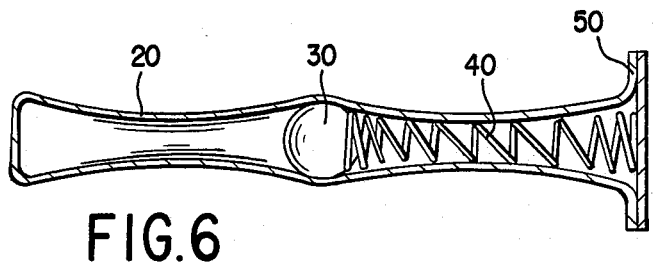
FIG. 6 is a view taken of a preferred embodiment of the present invention showing the invention after the inflator has been activated in response to an accident.

During an accident, the car decelerates causing the ball to move forward in the tube compressing the spring. As long as the car is experiencing a deceleration in excess of the force exerted by the spring on the ball, the ball will move away from its original location. If the primer then is ignited, the gas pressure in the primer chamber will collapse the thin walled aluminum tube 30 trapping the ball as shown in FIG. 6. Thus, for example, if the primer went off inadvertently and there was no deceleration of the automobile, the ball would be trapped at its start position. If on the other hand, the car is decelerating above 3 G's and therefore definitely in an accident, the ball would be trapped away from its home position.

This device which would add only a few cents to the cost of the airbag system in a very simple manner solves a problem, which if done external to the inflator, requires a separate sensor and some complicated circuitry.

Naturlly, many other systems could be designed using other spring mass systems such as band and roller devices, pendulums, etc. and other environments in the primer chamber could be used to trap the sensing mass, such as heat. If the mass were surrounded in plastic for example the heat of the primer could deform the plastic to trap the sensing mass. Also, a pressure sensor having an electrical output such as a Piezo electric device, or pressure switch, or a temperature sensor could be placed in the primer chamber and used in combination with an accelerometer to detect the simultaneous presence of gas pressure or temperature in the primer chamber and deceleration of the vehicle. An electronic circuit employing a fuse or other recording means, for example, would record if the vehicle is decelerating when pressure or temperature first appears in the primer chamber. Although more complicated than the preferred embodiment, it nevertheless still gives a more accurate indication of which event occurred first, deceleration of the vehicle or ignition of the primer.

Figure 7:
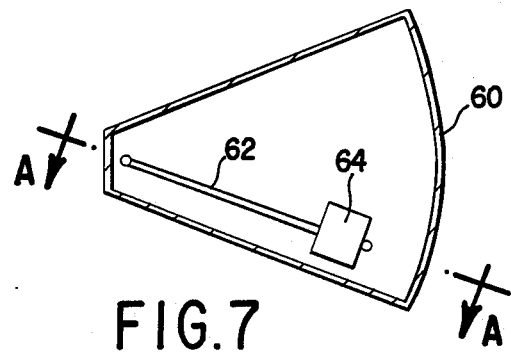
FIG. 7 is a view of a second embodiment of the present invention wherein the indicator is a pendulum device. The rest condition is shown.
Figure 8:
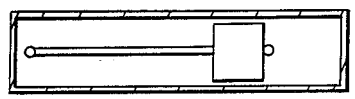
FIG. 8 is a sectional view of the embodiment of FIG. 7 taken along line A—A.

FIG. 7 illustrates a tube or chamber 60 housing a pendulum rod 62 with weighted member 64 at its end in a rest condition. FIG. 8 is a side view of the system of FIG. 7.

Figure 9:
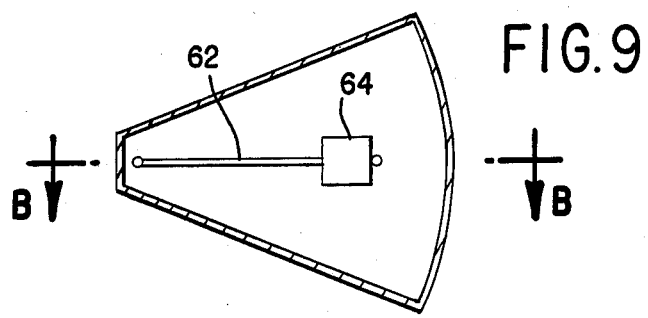
FIG. 9 is a view taken of the pendulum device of FIG. 7 in a condition after the inflator has been activated in response to an accident.

FIG. 9 illustrates the pendulum system of FIG. 7 in a condition after an accident. Rod 62 is rotated primarily by the weight of weighted member 64 which moves primarily in the direction of the moving vehicle (substantially perpendicular to line B-B) as a result of rapid deceleration.

Figure 10:
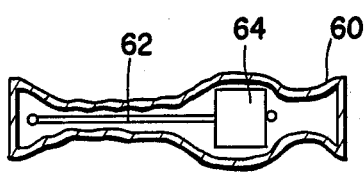
FIG. 10 is a sectional view of FIG. 9 taken along line BB.

FIG. 10 is a sectional view of the system of FIG. 9 illustrating that container 60 collapses about rod 62 and weighted member 64 as a result of the primer being ignited.

Figure 11:
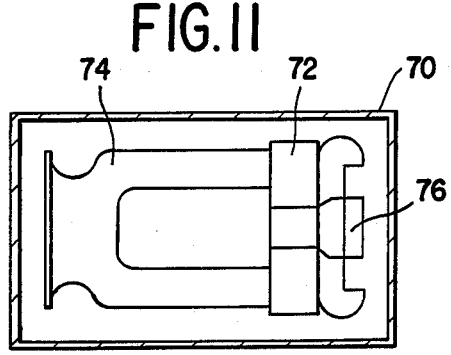
FIG. 11 is a view of the third embodiment of the present invention wherein the indicator is a band and roller device which is in a rest position.

FIG. 11 shows a ball and roller system having a container 70, a roller 72, a first roller section 74 and a second roller section 76.

Figure 12:
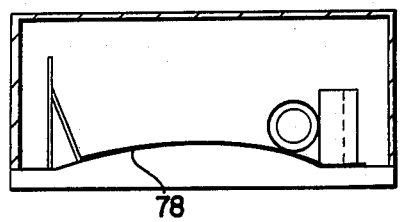
FIG. 12 is a sectional view of the band and roller device of FIG. 11.

FIG. 12 shows the system of FIG. 11 in side section.

Figure 13:
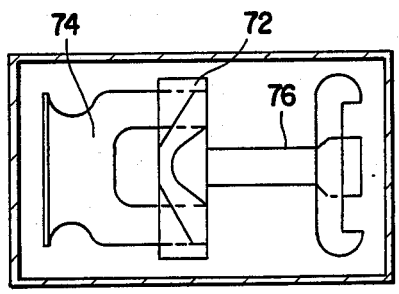
FIG. 13 is a top view of the band roller device of FIG. 11 in condition after the inflator has been activated in response to an accident.

FIG. 13 illustrates the ball and roller system of FIG. 11 in a condition after an accident. Due to rapid deceleration, the ball member 72 is translated in a direction of car movement. Curved bottom portion 78 provides resistance to movement of ball 72. First roller section 74 is partially rolled onto ball 72 while second section 76 is also unwound a certain amount.

Figure 14:
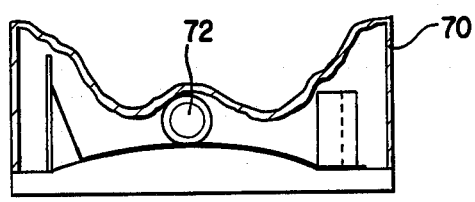
FIG. 14 is a sectional view of the band roller of FIG. 13.

FIG. 14 illustrates the system of FIG. 13 in side section showing container 70 collapsed onto ball 72 indicating forward motion of the ball and rapid deceleration of the vehicle.

Accidents were simulated using the NHTSA (National Highway Traffic Safety Administration) and the embodiment which is described. The clearance between the ball and tube for this device was 0.006 inches. The ball had the capability of traveling 0.625 inches before rebounding off the compressed spring. The spring gave an initial bias of 2.3 G's, which increased as the ball traveled down the tube to a maximum of 8 G's if the ball reached its maximum travel of 0.625 inches.

The simulations were run by first determining the time that a typical passenger compartment sensor would have fired on each of the crashes. Three milliseconds were added to this firing time to give the approximate time that pressure would appear in the primer chamber. The simulation model was then run and the travel of the event sequence indicator ball was recorded at the times determined above. Table I shows the results of the 20 simulations. The first column gives the trial number; the second column gives the crash description; the third column gives the distance traveled by mass at the time the pressure collapsed the tube, and the fourth column gives the results of simulations where 15 milliseconds were added to the firing time. This device would have given a false indication in cases 4, 7, 14, 15, and 16 if the inflation pressure was used instead of the primer pressure.

TABLE 1

| | Crash Description | Distance (Inches) | 15 Milliseconds |
|---|---|---|---|
| 1 | 39./9 mph, VTB #1 Chevrolet Citation 1980 | 0.262 | 0.154 |
| 2 | 29.9 mph, VTV #1 Chevrolet Impala 1978 | 0.299 | 0.433 |
| 3 | 30.1 mph, VTV #1 Chevrolet Impala 1978 | 0.288 | 0.368 |
| 4 | 48.0 mph, VTB #1 Chevrolet Citation 1980 | 0.256 | 0.000 |
| 5 | 35.0 mph, VTB #1 Chevrolet Citation 1980 | 0.244 | 0.389 |
| 6 | 34.9 mph, ITV #1 Volkswagen Rabbit 1979 | 0.262 | 0.446 |
| 7 | 34.8 mph, VTB #1 Volkswagen Rabbit 1979 | 0.268 | 0.044 |
| 8 | 59.1 mph, ITV #2 For Torino 1975 | 0.246 | 0.575 |
| 9 | 62.3 mph, VTV #1 Dodge Sportsman Van 1979 | 0.235 | 0.341 |
| 10 | 62.3 mph, VTV #2 Chevrolet Impala 1979 | 0.273 | 0.199 |

TABLE 1-continued

| | Crash Description | Distance (Inches) | 15 Milliseconds |
|---|---|---|---|
| 11 | 40.7 mph, VTB #1 Plymouth Fury 1975 | 0.275 | 0.230 |
| 12 | 25.2 mph, VTB #1 Dodge Sportsman Van 1979 | 0.276 | 0.152 |
| 13 | 45.1 mph, VTB #1 Volvo 244 1975 | 0.262 | 0.228 |
| 14 | 25.1 mph, VTB #1 Ford Van 1979 | 0.254 | 0.055 |
| 15 | 62.2 mph, ITV #2 Honda Civic 1975 | 0.249 | 0.025 |
| 16 | 63.6 mph, VTV #1 Ford Torino 1979 | 0.295 | 0.015 |
| 17 | 63.3 mph, VTV #2 Chevrolet Impala 1979 | 0.259 | 0.264 |
| 18 | 40.5 mph, VTB #1 Ford Torino 1975 | 0.257 | |
| 19 | 40.8 mph, VTB #1 Honda Civic 1975 | 0.215 | |
| 20 | 30.0 mph, VTB #1 Ford Van 1979 | 0.261 | |

VTB = Vehicle to Barrier
ITV = Impactor to Vehicle
VTV = Vehicle to Vehicle

Only these cases where the airbag would have been deployed were considered.

From the results here, as well as 280 cases studied, we see in all cases this ball travels in excess of 0.15 inches at the time that it would be frozen by the collapsing tube and thus would have indicated a crash was in progress.

For purposes of this disclosure, the term primer has been used to include the primary inflator initiating pyrotechnic device. As such, it would include stab primers which are used in mechanically initiated inflators such as disclosed in U.S. Pat. No. 4,580,810 issued to Breed and electric squibs used in electrically initiated airbag systems.

Thus, the aforenoted objects and advantages of the invention are most effectively obtained. Although, one somewhat preferred embodiment has been disclosed and described herein, it should be understood that this invention is in no sense limited thereby, and its scope is to be determined by that of the appended claims.

What is claimed is:

1. A device for indicating if an airbag inflator for a vehicle was set off in an accident which comprises:
   (a) a vessel enclosed at both ends which inserts into an airbag inflator housing, said vessel having an axis which is substantially aigned with an axis of said vehicle;
   (b) an object capable of moving along said axis of said vessel in response to a deceleration of said vehicle as it decelerates in excess of a predetermined level;
   (c) a means for exerting a force on said object to prevent it from moving along said axis unless said vehicle decelerates in excess of a predetermined level; and
   (d) a means for entraping said object during its movement along said axis of said vessel, said means preventing said object from further movement once a primer gas within said inflator housing is activated, said primer gas being physically separate from said airbag's interior both before and after activation of the primer gas.

2. The device of claim 1 in which said means for exerting a force is a spring.

3. The device of claim 1 in which said predetermined level is 2.3 G's.

4. The device of claim 1 in which said means for entrapping said object is the collapsing of said vessel in response to the gas pressure generated by said primer gas inside said inflator housing prior to inflation of said airbag.

5. The device of claim 4 in which said vessel is a thin gauge metal.

6. The device of claim 5 in which said metal is aluminum.

7. The device of claim 5 in which said vessel is plastic.

8. The device of claim 1 in which said means for entrapping said object is the collapsing of said vessel in response to the heat generated inside the inflator during inflation of said airbag.

9. The device of claim 1 in which said vessel is a tube and said object is a ball.

10. The device of claim 9 in which said ball is stainless steel.

11. The device of claim 1 in which said object is a pendulum.

12. The device of claim 1 in which said object is a band and a roller device.

13. A diagnostic device for use in conjunction with a gas generator comprising:
    means for sensing pressure caused by a primer gas;
    means for sensing deceleration; and
    recording means to record that deceleration was occurring when pressure caused by actuation of the primer gas appeared, said primer gas being physically separate from said gas generator's interior interior both before and after activation of the primer gas.

14. An indicator for determining that a vehicle was crashing when deployment of a safety device was initiated comprising:
    means for sensing that a vehicle is in a crash;
    means for sensing initiation of a primer gas used to initiate said safety device; and
    means for recording that the crash provided the primer gas initiator, said primer gas being physically separate from said safety devices interior both before and after initiation of the primer gas.

15. A method for determining that a vehicle was crashing when deployment of an airbag inflator was initiated comprising:
    providing an object capable of moving along an axis which is substantially aligned with the axis of said vehicle in response to deceleration of said vehicle in excess of a predetermined level; and
    recording the position of said object when gas pressure is generated by initiation of a primer gas, said primer gas being physically separate from said safety devices interior airbag inflator's interior both before and after initiation and the primer gas.

* * * * *